United States Patent [19]

Solero

[11] Patent Number: 5,030,882
[45] Date of Patent: Jul. 9, 1991

[54] PROTECTIVE SCREEN FOR A VISUAL DISPLAY DEVICE

[75] Inventor: Giorgio Solero, Turin, Italy
[73] Assignee: Baltea SpA, Ivrea, Italy
[21] Appl. No.: 318,257
[22] Filed: Mar. 3, 1989

[30] Foreign Application Priority Data

Mar. 3, 1988 [IT] Italy .................. 52933/88[U]

[51] Int. Cl.⁵ .................................... H04N 5/72
[52] U.S. Cl. .......................... 313/478; 313/479; 313/112; 358/247; 358/253
[58] Field of Search ............. 313/478, 474, 479, 112, 313/466; 358/250, 253, 245, 247; 350/315, 318

[56] References Cited

U.S. PATENT DOCUMENTS

| | | | |
|---|---|---|---|
| 4,031,553 | 6/1977 | Sumiyoshi et al. | 358/247 |
| 4,652,085 | 3/1987 | Selling et al. | 358/253 X |
| 4,712,870 | 12/1987 | Robinson et al. | 358/250 X |

FOREIGN PATENT DOCUMENTS 535261 10/1955 Italy ........................... 358/247
652283 7/1963 Italy ........................... 358/253

Primary Examiner—Donald J. Yusko
Assistant Examiner—Michael Horabik
Attorney, Agent, or Firm—Banner, Birch, McKie & Beckett

[57] ABSTRACT

A protective screen for a visual display unit (VDU) comprises a filter layer which is operative to protect the operator from electrostatic and electromagnetic fields and from residual radiation of a cathode ray tube (CRT) of the VDU. The VDU comprises a body structure for the CRT and the screen comprises a support frame for the filter layer, an intermediate support between the frame and the body structure of the VDU and a pair of fixing plates which are adjustable both front to back and angularly, for fixing the intermediate support to the upper portion of the body structure independently of the specific form of the body structure. The frame of the screen is also pivoted to the intermediate support to permit the filter layer to be disposed in front of the display surface of the CRT or be swung up to expose the CRT screen.

15 Claims, 3 Drawing Sheets

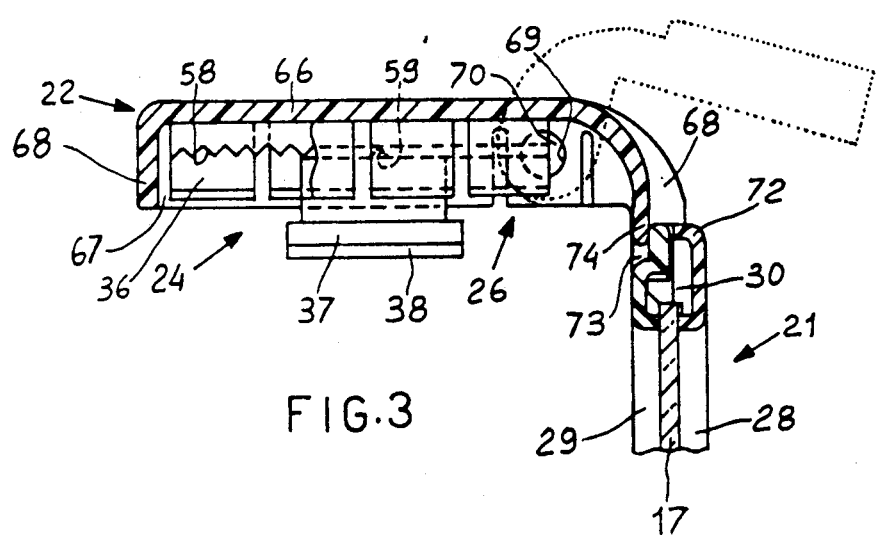
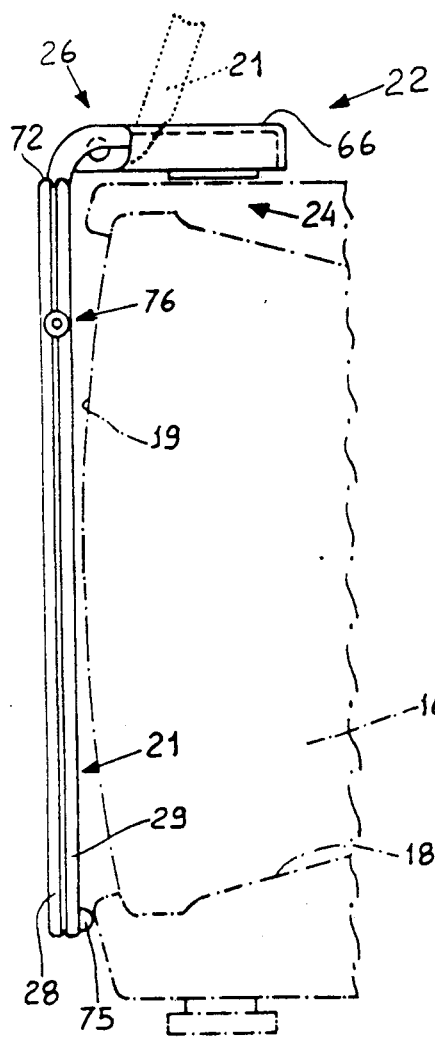
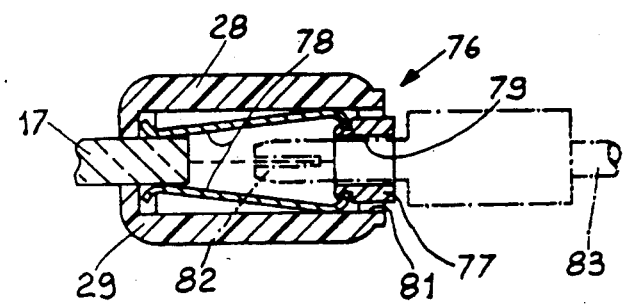
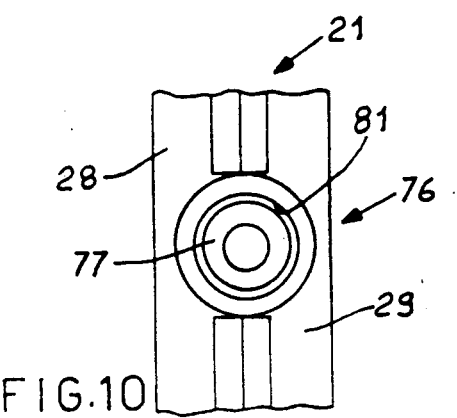

PROTECTIVE SCREEN FOR A VISUAL DISPLAY DEVICE

BACKGROUND OF THE INVENTION (1) Field of the Invention

The present invention concerns a protective screen for a visual display device with a cathode ray tube having a display surface and a body structure for the cathode ray tube, comprising a filter layer which is operative for protection purposes.

(2) Description of the Prior Art

Cathode ray tubes of more modern display units have levels of electrostatic and electromagnetic fields and a level of other radiations, which are generally considered not to be harmful. In order to lower the levels of the above-mentioned fields and residual radiations, it may be appropriate or it may be required by some health regulations to dispose in front of the display screen a protective screen which performs a filter function in regard to the electrostatic and electromagnetic fields and the residual radiation emitted by the cathode ray tube.

A screen of the above-defined type is known, which is permanently mounted between the body structure and the display surface of the cathode ray tube. That known construction is expensive since it adds the cost of the screen to the cost of the display unit, even when the screen is not strictly necessary. In addition the known construction does not permit the protective screen to be removed from the display screen when that might be required for cleaning the screen and to provide a better view of the images on the cathode ray tube.

SUMMARY OF THE INVENTION

The object of the present invention is therefore to provide a protective screen which can be easily fixed to the body structure of the visual display unit and which also permits direct viewing of the display surface of the cathode ray tube.

The screen according to the present invention comprises a support frame for the filter layer. An intermediate support is disposed between the frame and the body structure or casing of the cathode ray tube. Adjustable fixing means are provided for fixing the intermediate support on a portion of the body structure. The frame is connected to the intermediate support by pivot means which enable the frame and filter layer to be pivoted with respect to the screen of the cathode ray tube, preferably between a position in front of the screen and an upswing position which exposes the screen.

BRIEF DESCRIPTION OF THE DRAWINGS

The invention will be described in more detail, by way of example, with reference to the accompanying drawings, in which:

FIG. 2 is a side view of part of the screen shown in FIG. 1, FIG. 3 shows some sectioned details of the screen shown in FIG. 2, on an enlarged scale, FIG. 9 shows other details from FIG. 1, in section taken along line IX—IX and on an enlarged scale, and FIG. 10 is a front view of part of the structure shown in FIG. 9.

DESCRIPTION OF THE PREFERRED EMBODIMENTS

Figure 1:
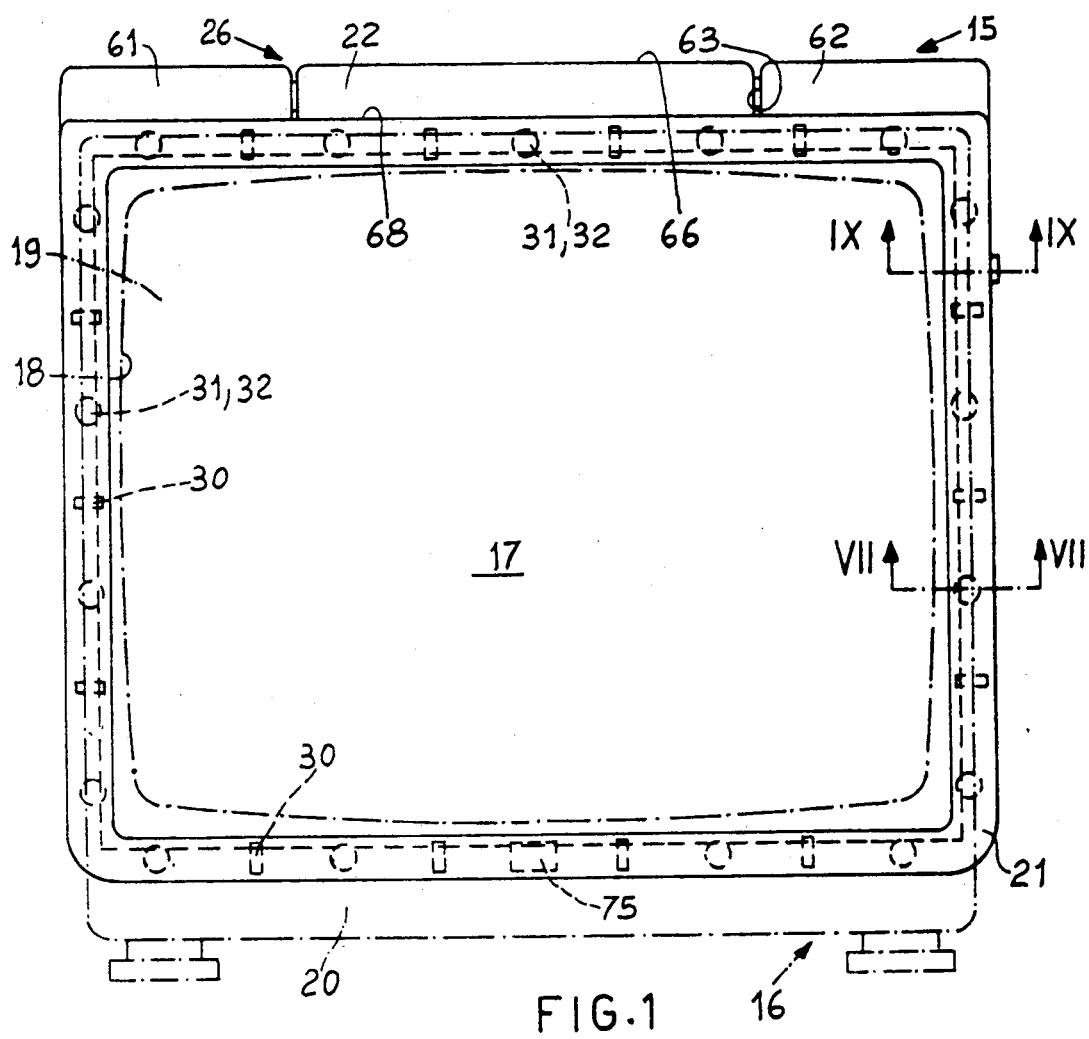
FIG. 1 is a diagrammatic view of the screen according to the invention in the position of use.

Referring to FIGS. 1, 2 and 3, a protective screen 15 for a display unit (VDU) 16 comprises a filter layer 17 which is operative to provide the protection effect. The display unit 16 of known type is indicated in dash-dotted lines in the drawings and comprises cathode ray tube 18 having a display surface 19 and a body structure 20 for the cathode ray tube 18.

In accordance with the invention, the screen 15 comprises a support frame 21 for the filter layer 17, an intermediate support 22, adjustable fixing means 24 for fixing the intermediate support 22 to the upper portion of the body structure 20 and pivot means 26 between the frame 21 and the intermediate support 22 for pivoting the filter layer 17 with respect to the display surface 19 of the cathode ray tube 18 when the support 22 is fixed to the body structure 20.

Figure 7:
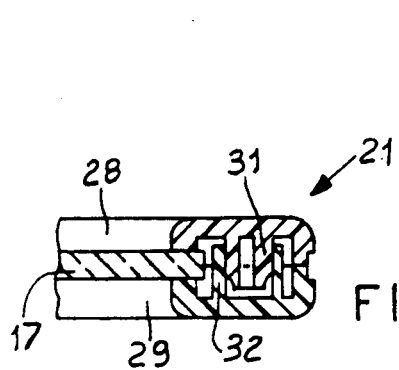
FIG. 7 shows other details from FIg. 1 in section taken along line VII—VII and on an enlarged scale.

The frame 21 comprises two half shell portions 28 and 29 (see FIGS. 3 and 7) of plastics material which are provided with complementary coupling elements 31 and 32 respectively for interengagingly locking the shell portions 28 and 29 together, and ribs 30 on the shell portion 28 for correct positioning of the filter layer 17 between the two shell portions 28 and 29. The complementary elements 31 and 32 are introduced and locked relative to each other by means of a simple pressure. The two shell portions 28 and 29 are each of a C-shaped section. The outside edges of the shell portions 28 and 29 are in mutual contact and their inside edges are resiliently urged against the filter layer 17 in such a way as to compensate for any dimensional differences in the filter layer 17.

Figure 4:
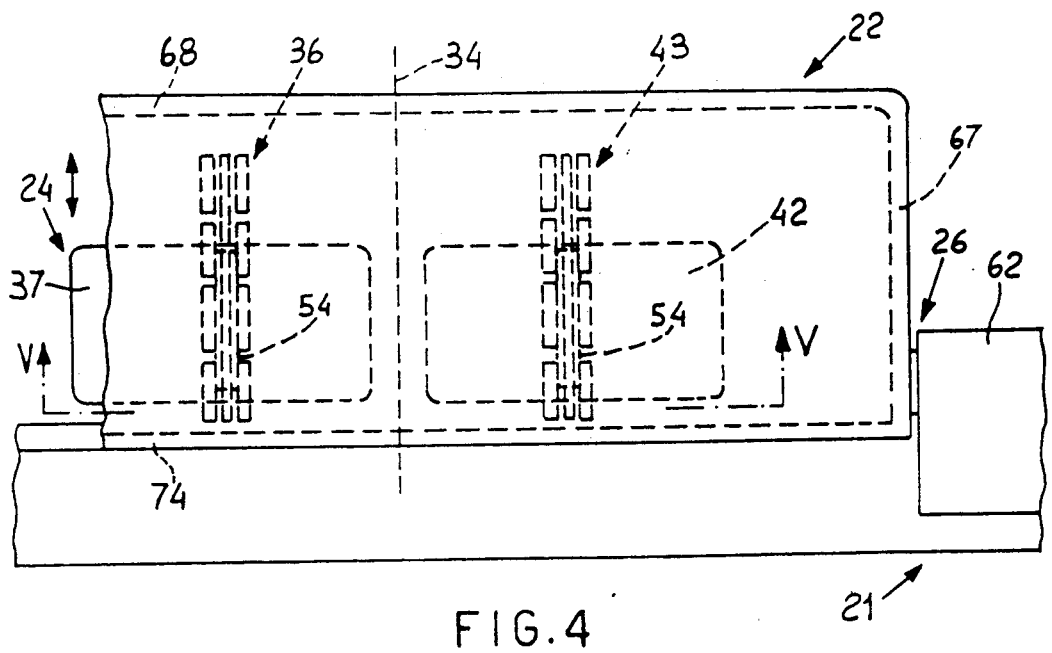
FIG. 4 is a plan view of part of some details of the screen shown in FIG. 1, on an enlarged scale.

In use the intermediate support 22 (see FIGS. 1, 3 and 4) is substantially centered with respect to the screen 15 and the body structure 20 of the VDU 16 and extends over a fraction, for example half, of the maximum width of the screen 15. The intermediate support 22 has an axis of symmetry 34 and a fist adjustable fixing means 24 comprise a guide 36 extending front to back. On the lower portion of the support 22, parallel to the axis 34, is a rectangular plate member 37 which is capable of being fixed to the body structure 20 of the VDU 16, for example by means of a double-sided adhesive pad 38. The plate member 37 is provided with a rib 39 (see FIG. 5) extending front to back and carrying a cylindrical body 54 which can both slide in the guide 36, with freedom of front-to-back translatory movement with respect to the support 22, and freedom to turn about the axis of the cylinder (compare FIGS. 5 and 6) in this way the screen 15 is capable of being disposed at the optimum distance from the surface 19 of the CRT 18, at a position corresponding to an optimised position for fixing of the plate member 37 to the body structure 20.

The plate member 37 is disposed to the left side of the axis of symmetry 34 of the support 22. The fixing means 24 are completed by a second plate member 42 which is identical to the plate member 37 and which is disposed symmetrically to the plate member 37, with respect to the transverse axis of symmetry 34 of the support 22, and can also be fixed to the body structure 20 by means of a double-sided adhesive pad 38. The plate member 42 also comprises a rib 39 and a cylindrical body 54 by means of which it is slidable in a guide 43 on the support 22, which is identical to the guide 36 and which is disposed symmetrically to the guide 36 with respect to the axis 34.

Figure 5:
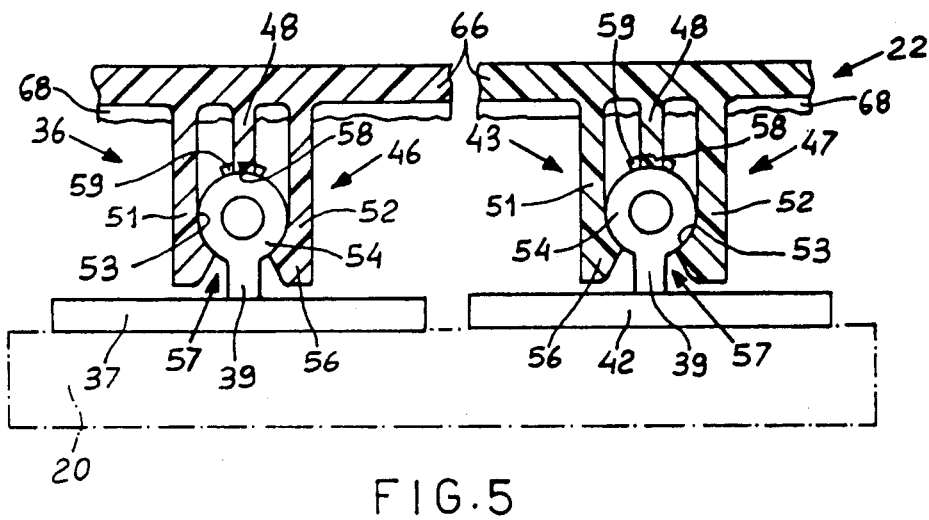
FIG. 5 shows details from FIG. 4 in section taken along line V—V and on an enlarged scale.
Figure 6:
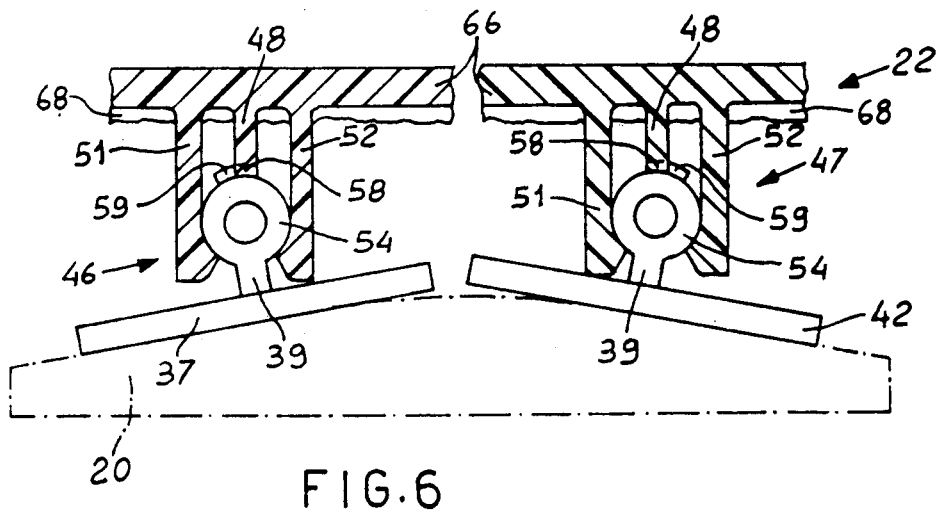
FIG. 6 shows the details illustrated in FIG. 5, in a second working position.

The cylindrical bodies 54 of the plate members 37 and 42, together with the guides 36 and 43, form cylindrical coupling joints as indicated at 46 and 47 (see FIG. 5) which allow the plate members 37 and 42 rotational freedom with respect to the intermediate support 22. That makes it possible to adjust the angular positions of the plate members to the particular shape of that part of the body structure of the VDU 16 to which the plate members are to be fixed, as can be seen in FIGS. 5 and 6. In FIGS. 5 and 6, the body structures 20 have different curvatures.

The guides 36 and 43 each comprise a central rib 48 which is parallel to the axis 34 and which projects from the lower portion of the support 22 and pairs of side flanges 51 and 52 which are parallel to the rib 48 and which, together with the terminal portion of the rib 48, define a corresponding cylindrical seat 53. Each coupling joint 46 and 47 comprises the cylindrical seat 53 of the support 22 and the cylindrical body 54 of the respective plate members 37 and 42. Each cylindrical body 54 is thus capable of sliding and rotating between the corresponding limbs 51 and 52 with freedom for translatory and rotational movement with respect to the intermediate support 22.

The side flanges 51 and 52 are each provided with a projection 56 which defines a constriction 57 for the cylindrical body 54. The flanges 51 and 52 are also capable of resiliently yielding to permit each cylindrical body 54 to be snapped into position and removed therefrom by way of the constriction 57 of the flanges 51 and 52.

The two ribs 48 are each toothed (58) along their length. A corresponding tooth 59 on each cylindrical body 54 is capable of cooperating with the teeth 58 with an interference fit, for the purposes of locking the plate members 37 and 42 in the desired position. Manual movement of the support 22 in a transverse direction will cause the teeth 58 to be ridden over, resulting in positioning in incremental steps of the support 22. On the other hand, the interengagement of the teeth 59 with the teeth 58 does not impede the rotary movement of the plate members 37 and 42 with respect to the support 22 and the dimensions of the teeth 59 are such as to guarantee coupling to the teeth 58 in all possible angular positions of the two plate members.

The frame 21 (see FIG. 1) is defined by four sides, to give a rectangular shape, in which the upper side and the lower side are longer than the other two sides when the screen 15 is mounted on the VDU 16. The upper side of the frame 21 comprises two lugs 61 and 62 which are provided on the outside shell portion 28. The two lugs 61 and 62 project upwardly from the upper side and with respect to the upper side of the inner shell portion 29 and define a rectangular space 63 in which the intermediate support 22 is housed.

Figure 8:
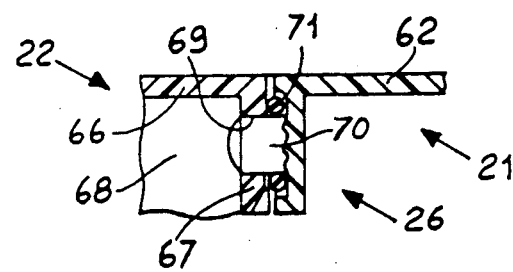
FIG. 8 shows further details from the screen illustrated in FIG. 1, in section taken along line VIII—VIII in FIG. 4.

The support 22 (see FIG. 3) comprises a plate of substantially parallelepipedic shape and which is downwardly hollow and which is defined by an upper plate 77, a pair of side walls 67 and a pair of front and rear walls 68. The pivot means 26 comprises two pairs of pivot seats 69 and corresponding pins 70 which are interposed between the side walls 67 of the support 22 and the projecting lugs 61 and 62 of the frame 21. A friction ring 71 (see FIG. 8) of resiliently yielding material, for example rubber, is forced between each wall 67 of the support 22 and the projecting lug 61,62 of the frame 21 to permit the filter layer 17 to rotate with respect to the display surface of the CRT 18 in a damped fashion (see FIG. 2). In addition the frame 21 can assume a stable position affording total access to the surface 19 by virtue of a rotary movement of more than 180°, in which an upper edge 72 of the shell portion 28 of the frame 21, in the space 63, is arrested against the upper plate 66 of the support 22 in the position shown in dotted lines.

In use the filter screen 17 remains, under the force of gravity, in a substantially vertical position, with an upper edge 73 (see FIG. 3) of the shell portion 29 arrested against a vertically downwardly projecting limb 74 of the upper plate 66 of the support 22. Finally a damping block 75 (see FIG. 2), for example of rubber, is disposed on the lower edge of the shell portion 29 and prevents damage to the screen 15 and the VDU 16 in the event that the filter layer 17 is moved violently towards the surface 19.

The filter layer 17 which is known per se is transparent and has two metallised and transparent surface layers. The frame 21 is of insulating material and comprises a mounting 76 for a socket 77 (see FIG. 9) of conductive material, provided with two resilient limbs 78 in electrical contact with the layer or the metallised layers of the filter layer 17. The socket 77 comprises a cylindrical opening 79 which is coaxial with an opening 81 of the mounting 76 to permit the introduction of a plug 82 into the opening 79, and in turn is capable of permitting an earthing connection for the filter layer 17 by means of a cable 83.

The above-described protective screen is capable of being easily fixed to the body structure 20 of the VDU 16 and ensures that the filter layer 17 can be easily removed by rotary movement of the frame 21 about the pins 70 to the stable position shown in dotted lines in FIG. 2.

In particular the filter layer 17 is made of lead tempered glass loaded to filter ultraviolet UVA and UVB radiation with no essential variation to the visible range. Underneath the metallic layers, the glass is coated with one or more layers of anti-reflective coating material to reduce external reflections, though maintaining a high transparency level and improving sharpness and stability of the displayed image.

In alternative, the filter layer 17 may provide a sole metallised surface layer on the face laying in front of the display surface 19 of the CRT 18.

The provision of the protective screen of the invention make it possible to the operator to work longer at the video display and also to enable an easy cleaning of the filter layer 17 and the display surface 19 of the CRT 18 after the lifting of the protective screen away from the video display unit 16.

What is claimed is:

1. A protective screen for a visual display unit with a cathode ray tube having a display surface and a body structure for the cathode ray tube, said screen comprising a filter layer which is operative for protection purposes; a support frame for said filter layer; fixing means for being fixed to said body structure; an intermediate member; pivot means on said support frame and said intermediate member to pivot said filter layer with respect to said intermediate member; and adjustable means for adjustably positioning the intermediate member with respect to the fixing means, wherein said adjustable means comprise first and second guide members on said intermediate member and first and second coupling joints on said fixing means, wherein the second guide member is parallel to and spaced apart relative to the first guide member and wherein the first guide member and the second guide member can slide with respect to said first coupling joint and said second coupling joint, respectively, for a back and forth adjustment of the intermediate member with respect to the display surface; and first resilient toothed positioning means close to said first guide member and said first coupling joint and second resilient toothed positioning means close to said second guide member and said second coupling joint, respectively, for movement in incremental steps as between said intermediate member and said fixing means; and wherein said pivot means comprise two lugs projecting from an upper portion of said support frame spaced apart from each other, two side portions of said intermediate member and first and second pivotal couplings between said lugs and said side portions.

2. A protective screen according to claim 1, wherein said frame comprises two half shell portions of plastics material nd complementary coupling elements for interengagingly locking said filter layer between said tow half shell portions.

3. A protective screen according to claim 1, wherein said intermediate member is substantially centered in use with respect to the screen of the cathode ray tube and said body structure of the display unit and extends over a fraction of the width of the screen.

4. A protective screen according to claim 1, wherein said intermediate member comprises an axis of symmetry and said first guide member and said second guide member are disposed parallel to and by opposite sides with respect to said axis of symmetry.

5. A protective screen according to claim 1, wherein said fixing means comprise two plate members for fixing to said body structure, and wherein said first guide member and said second guide member and said first coupling joint and said second coupling joint comprise two corresponding cylindrical coupling joints between said plate members and said intermediate member with rotational freedom of the two plate members with respect to said intermediate member for adaption of the angular positions of the plate members to said body structure of the VDU.

6. A protective screen according to claim 1, wherein said first guide member and said second guide member each comprise a pair of flanges extending front to back on said intermediate member, wherein said fixing means comprises a pair of plate members for individual fixing to said body structure, and wherein said first coupling joint and said second coupling joint each comprise a projection having a cylindrical terminal body, and in which each said cylindrical body slides and rotates with a pair of said flanges with freedom of translatory and rotational movement with respect to said intermediate member.

7. A protective screen according to claim 6, wherein said flanges are resiliently yielding to permit snap insertion and removal of said cylindrical bodies.

8. A protective screen according to claim 6, wherein said flanges are resiliently yielding to permit snap insertion and removal of said cylindrical bodies and further comprising a rib parallel to said flanges, said resilient toothed positioning means comprising teeth and a tooth one on said cylindrical body and the other on said rib and in which said tooth maintains engagement with said teeth in all possible angular positions of said plate members.

9. A protective screen according to claim 1, further comprising a friction ring of resiliently yielding material which is forced between and edge of said intermediate member and a projecting lug.

10. A protective screen according to claim 1, wherein said filter layer has at least one conductive surface and said frame is of insulating material and comprises an outwardly open housing in which there is provided a socket of conductive material, which socket is in electrical contact with said conductive surface of the filter layer and is housed in said housing to permit a ground connection for said filter layer.

11. A protective screen according to claim 1, wherein said support frame is of rectangular shape with four sides of which one upper side of greater length comprises said two lugs and in which the second pivotal couplings are spaced apart a distance substantially equal to about a half of said one upper side of great length.

12. A protective screen for a visual display unit with a cathode ray tube having a display surface and a body structure for the cathode ray tube, said screen comprising a filter layer which is operative for protection purposes; a support frame for said filter layer; fixing means for being fixed to said body structure; an intermediate member; pivot means on said support frame and said intermediate member to pivot said filter layer with respect to said intermediate member; and adjustable means for adjustably positioning the intermediate member with respect to the fixing means, wherein said adjustable means comprise first and second guide members on said intermediate member and first and second coupling joints on said fixing means, wherein the second guide member is parallel to and spaced apart relative to the first guide member and wherein the first guide member and the second guide member can slide with respect to said first coupling joint and said second coupling joint, respectively, for a back and forth adjustment of the intermediate member with respect to the display surface; and first resilient toothed positioning means close to said first guide member and said first coupling joint and second resilient toothed positioning means close to said second guide member and said second coupling joint, respectively, for movement in incremental steps as between said intermediate member and said fixing means;

wherein said first guide member and said second guide member each comprise a pair of flanges extending front to back on said intermediate member;

wherein said fixing means comprise a pair of plate members for individual fixing to said body structure; and wherein said first coupling joint and said second coupling joint each comprise a projection having a cylindrical terminal body, and in which each said cylindrical body slides and rotates within a pair of said flanges with freedom of translatory and rotational movement with respect to said intermediate member for adaption of the angular position of the plate members to said body structure.

13. A protective screen according to claim 12, wherein said intermediate member comprises an axis of symmetry and said first guide member and said second guide member are disposed parallel to and by opposite sides with respect to said axis of symmetry.

14. A protective screen according to claim 12, wherein said flanges are resiliently yielding to permit snap insertion and removal of said cylindrical bodies.

15. A protective screen according to claim 14, wherein said first resilient toothed positioning means comprise for each said first guide member and said second guide member a rib intermediate and parallel to the pair of flanges and teeth and a tooth one on said cylindrical body and the other on said rib and in which said tooth maintains engagement with said teeth in different angular positions of said plate members.

* * * * *

UNITED STATES PATENT AND TRADEMARK OFFICE
CERTIFICATE OF CORRECTION

PATENT NO. : 5,030,882
DATED : July 9, 1991
INVENTOR(S) : Georgio SOLERO

It is certified that error appears in the above-identified patent and that said Letters Patent is hereby corrected as shown below:

Column 5, line 34 change "nd" to --and--;
line 67 change "with" to --within--.

Signed and Sealed this

First Day of December, 1992

Attest:

DOUGLAS B. COMER

*Attesting Officer*     *Acting Commissioner of Patents and Trademarks*